United States Patent
Hassan et al.

(10) Patent No.: US 11,240,343 B2
(45) Date of Patent: Feb. 1, 2022

(54) DEVICE PROFILE DETERMINATION AND POLICY ENFORCEMENT

(71) Applicant: MICROSOFT TECHNOLOGY LICENSING, LLC, Redmond, WA (US)

(72) Inventors: Amer Hassan, Kirkland, WA (US); Mike Davis, Seattle, WA (US); Nikolay Muravlyannikov, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/563,683

(22) Filed: Sep. 6, 2019

(65) Prior Publication Data
US 2021/0075885 A1 Mar. 11, 2021

(51) Int. Cl.
*H04L 29/08* (2006.01)
(52) U.S. Cl.
CPC .......... *H04L 67/327* (2013.01); *H04L 67/141* (2013.01); *H04L 67/322* (2013.01)
(58) Field of Classification Search
CPC .... H04L 67/327; H04L 67/141; H04L 67/322
USPC .......................................................... 709/227
See application file for complete search history.

(56) References Cited

U.S. PATENT DOCUMENTS

| | | | |
|---|---|---|---|
| 7,603,114 B2 * | 10/2009 | Carlson | H04W 4/029 455/415 |
| 7,889,715 B2 | 2/2011 | Criddle et al. | |
| 9,277,053 B2 | 3/2016 | Fallen-Bailey | |
| 9,426,162 B2 | 8/2016 | Dabbiere et al. | |
| 9,749,382 B2 | 8/2017 | Payette et al. | |
| 10,075,472 B2 | 9/2018 | Leung et al. | |
| 2007/0049216 A1 * | 3/2007 | Karaoguz | H04B 1/406 455/90.3 |
| 2008/0299954 A1 * | 12/2008 | Wright | H04W 4/024 455/414.1 |

(Continued)

FOREIGN PATENT DOCUMENTS

WO 2017023528 A1 2/2017

OTHER PUBLICATIONS

"GeoDNS Explained", Retrieved From: https://web.archive.org/web/20190512175119/https://constellix.com/dns/geo-dns-services/geo-dns-explained/, May 12, 2019, 10 Pages.

(Continued)

*Primary Examiner* — Glenford J Madamba
(74) *Attorney, Agent, or Firm* — NovoTechIP International PLLC

(57) ABSTRACT

Techniques for operating a communication platform herein can be used to select a profile to be used for configuration one or more parameters of the communication session. These techniques include receiving a signal from a user device to initiate a communication session between a first party and a second party via the communications platform; determining a context of the communication session based on contact information, calendar information, or both associated with the first party, the second party, or both; selecting a profile from a plurality of profiles based on the context; and handling the requested communication session according to the selected profile by setting one or more communications parameters based on the selected profile.

18 Claims, 10 Drawing Sheets

Example Profile = (CLI, QoS, Routing, Policy, feature permission)

Selection Criteria

Profile 1
Profile 2
.
.
.
Profile N

Number range dialed
Number range received
Location
Plan (voice, data, SMS)
Time of Day
Correlation with Directory
Correlation with Calendar Profile X
- transient, or
- persistent

(56) References Cited

U.S. PATENT DOCUMENTS

2013/0185285 A1* 7/2013 Shuman .............. H04L 51/04
707/722
2013/0232213 A1* 9/2013 Bustamente .......... H04L 67/306
709/206

OTHER PUBLICATIONS

"Locational Privacy", Retrieved From: https://web.archive.org/web/20190709110846/https:/epic.org/privacy/location/, Jul. 9, 2019, 14 Pages.

Jacobsen, et al., "Calling Policies in Microsoft Teams", Retrieved From: https://docs.microsoft.com/en-us/microsoftteams/teams-calling-policy, May 6, 2019, 3 Pages.

Smith, et al., "Set the Caller ID for a User", Retrieved From: https://docs.microsoft.com/en-us/microsoftteams/set-the-caller-id-for-a-user, Jul. 19, 2019, 6 Pages.

Turne, Andrew, "Geolocation by IP Address", Retrieved From: https://www.linuxjournal.com/article/7856, Oct. 25, 2004, 8 Pages.

"International Search Report and Written Opinion Issued in PCT Application No. PCT/US20/038006", dated Aug. 25, 2020, 11 Pages.

* cited by examiner

DEVICE PROFILE DETERMINATION AND POLICY ENFORCEMENT

BACKGROUND

Various communications platforms have been developed that provide support communications sessions that may include voice calls, video calls, and text-based chat. The communications platforms may support many simultaneous users, and the communications platforms need to make intelligent decisions as to how to allocate limited network resources and bandwidth while providing a good user experience. One way that communications platforms may determine how to allocate resources is to define profiles that can be used to determine how to allocate these resources. There are significant areas for new and approved mechanisms for making efficient and accurate determinations as to which profile to select for a communication session.

SUMMARY

A computing device according to a first aspect of this disclosure includes a processor and a computer-readable medium. The computer-readable medium stores instructions for causing the processor to perform operations including receiving a signal from a user device to initiate a communication session between a first party and a second party via the communications platform; determining a context of the communication session based on contact information, calendar information, or both associated with the first party, the second party, or both; selecting a profile from a plurality of profiles based on the context; and handling the requested communication session according to the selected profile by setting one or more communications parameters based on the selected profile.

A method for operating a communications platform according to a second aspect of this disclosure includes receiving a signal from a user device to initiate a communication session between a first party and a second party via the communications platform; determining a context of the communication session based on contact information, calendar information, or both associated with the first party, the second party, or both; selecting a profile from a plurality of profiles based on the context; and handling the requested communication session according to the selected profile by setting one or more communications parameters based on the selected profile.

A memory device according to a third aspect of this disclosure stores instructions that, when executed on a processor of a computing device, cause the computing device to operate a communications platform, by: receiving a signal from a user device to initiate a communication session between a first party and a second party via the communications platform; determining a context of the communication session based on contact information, calendar information, or both associated with the first party, the second party, or both; selecting a profile from a plurality of profiles based on the context; and handling the requested communication session according to the selected profile by setting one or more communications parameters based on the selected profile.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
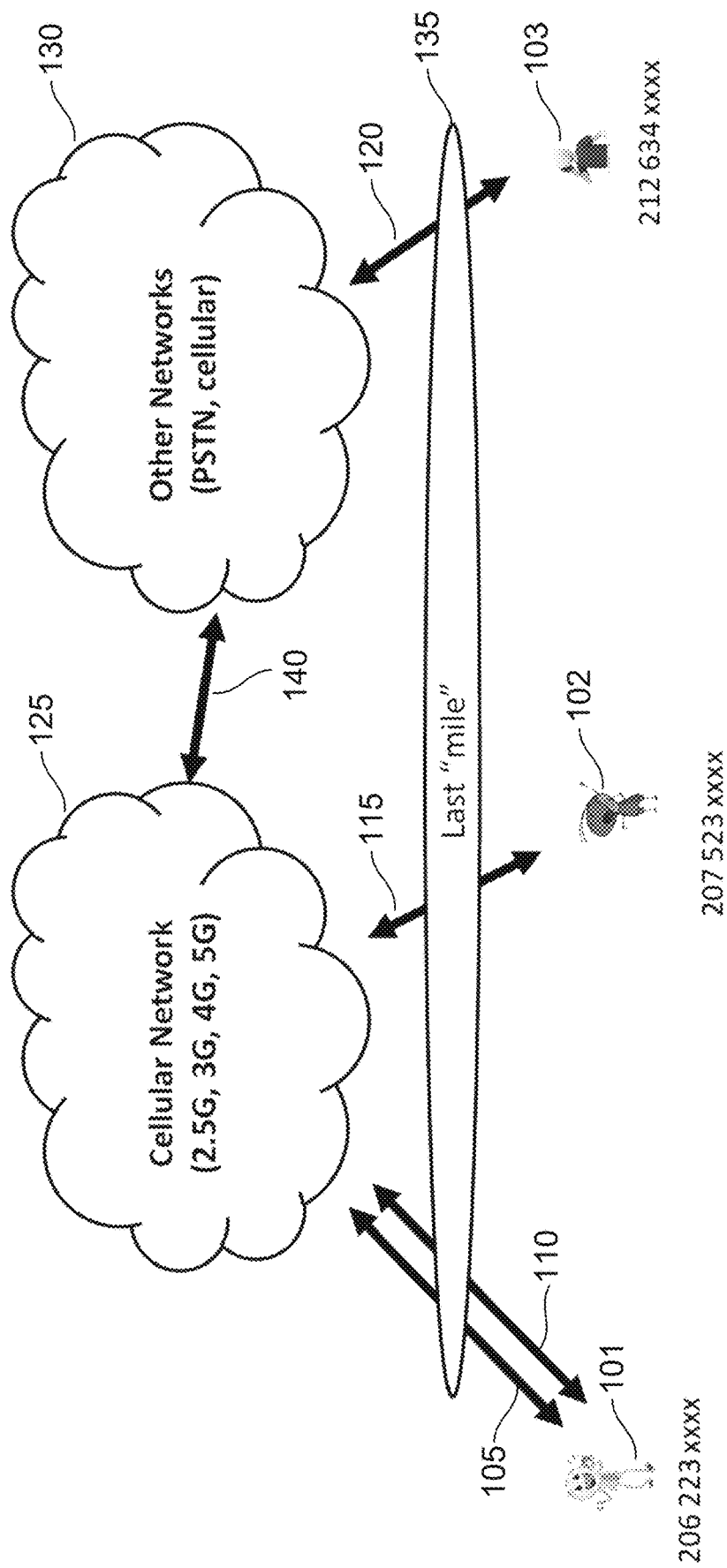
FIG. 1 presents an example of an operating environment in which a user may place a call to another user via a mobile wireless network.

FIG. 1 illustrates an example operating environment 100 in which includes client devices 101, 102, and 103, cellular network 125, other network(s) 130, and last mile infrastructure 135. The cellular network 125 is a communication network which facilitates wireless communications with the user devices 101, 102, and 103. The cellular network 125 may provide two-way wireless transmissions to the client device 101, 102, and 103. The cellular network may, for example, provide voice call support over a first wireless link 105, and data uplink and downlink support over a second wireless link 110. The wireless links 105 and 110 are illustrated as separate wireless links for the purpose of discussion. However, the cellular network 125 may utilize the same wireless frequencies, bandwidth, channels, etc. to support the data and voice communications.

The other network(s) 130 may be one or more networks separate from the cellular network 125. The other networks(s) 130 may include one or more networks associated with other cellular network providers. The other network(s) 130 may include a Public Switched Telephone Network (PSTN) which typically provides telephony services for fixed-location telephone devices. The cellular network 125 is configured to communicate with the other network(s) 130 to facilitate communications between subscribers of the cellular network and subscribers of the other network(s) 130. The cellular network 125 may also be connected to other networks, such as the Internet to facilitate data access for subscribers of the cellular network 125.

The last mile infrastructure 135 comprises equipment that facilitates communications between the user devices 101, 102, and 103 and the cellular network 125, and/or the other network(s) 130. The last mile infrastructure 135 may include components of the cellular network 125, such as wireless base stations that facilitate wireless communications with wireless-enable user devices. The last mile infrastructure 135 may include macrocell base stations, small cell wireless base stations such as microcells, picocells, and femtocells, or a combination thereof. The last mile infrastructure 135 may also include Wi-Fi and/or other types of wireless local area network (WLAN) access points. The last mile infrastructure 135 may also include wired connections from the other network(s) 130 to location of the user devices. The wired connections may include subscriber lines connecting landline telephones to a local telephone exchange, coaxial cable connecting user devices to a cable provider's network, and/or other types of wired network connections.

The user devices 101, 102, and 103 may typically be embodied in a mobile computing device, such as a mobile phone, smart phone, a wearable device (for example, a smart watch), a gaming and/or entertainment system, a tablet computer, laptop computer, or other portable computing device. In some implementations, the user devices may be other types of computing devices are typically not considered to be portable, but may still rely on the cellular network 125 to provide two-way communications, such as a server computer, a personal computer (PC), a set-top box (STB), or an Internet of Things (IoT) device. This list is meant to provide examples of the types of computing devices that may be found in a typical computing environment and is not intended to be exhaustive.

In a first example that illustrates how the operating environment may be utilized, the user of the user device 101 originates a voice call to the user of the user device 102. The call request may include a phone number associated with the user device 102. The phone number may be assigned to the user device 102 by the cellular provider. The call request may be transmitted to the cellular network 125 via the first wireless link 105. The cellular network 125 may include components configured to look up a network with which the called number is associated and to route the call to the appropriate network. In this example, the called number is the on the same network, cellular network 125, as the user device 101. The cellular network 125 can route the call request to the user device 102 via the third wireless link 115 and establish a call session between the user device 101 and the user device 102 in response to the user device 102 accepting the call request.

In a second example that illustrates how the operating environment may be utilized, the user of the user device 101 originates a call to the user of the user device 103. The user device 103 is associated with the other network(s) 130 and may be a landline phone, a voice-over IP (VOIP) phone, or a mobile device associated with a different cellular network provider. The call request is received by the cellular network 125, and the cellular network 125 determines that the called number is associated with the other network(s) 130. The call request may be routed to the other network via the communication link 140, and the other network(s) 130 can send a signal to the user device 103 via link 120 to indicate that there is an incoming call request. The cellular network 125 and the other network(s) 130 can facilitate setting up a call session if the user device 103 accepts the call request.

Figure 2:
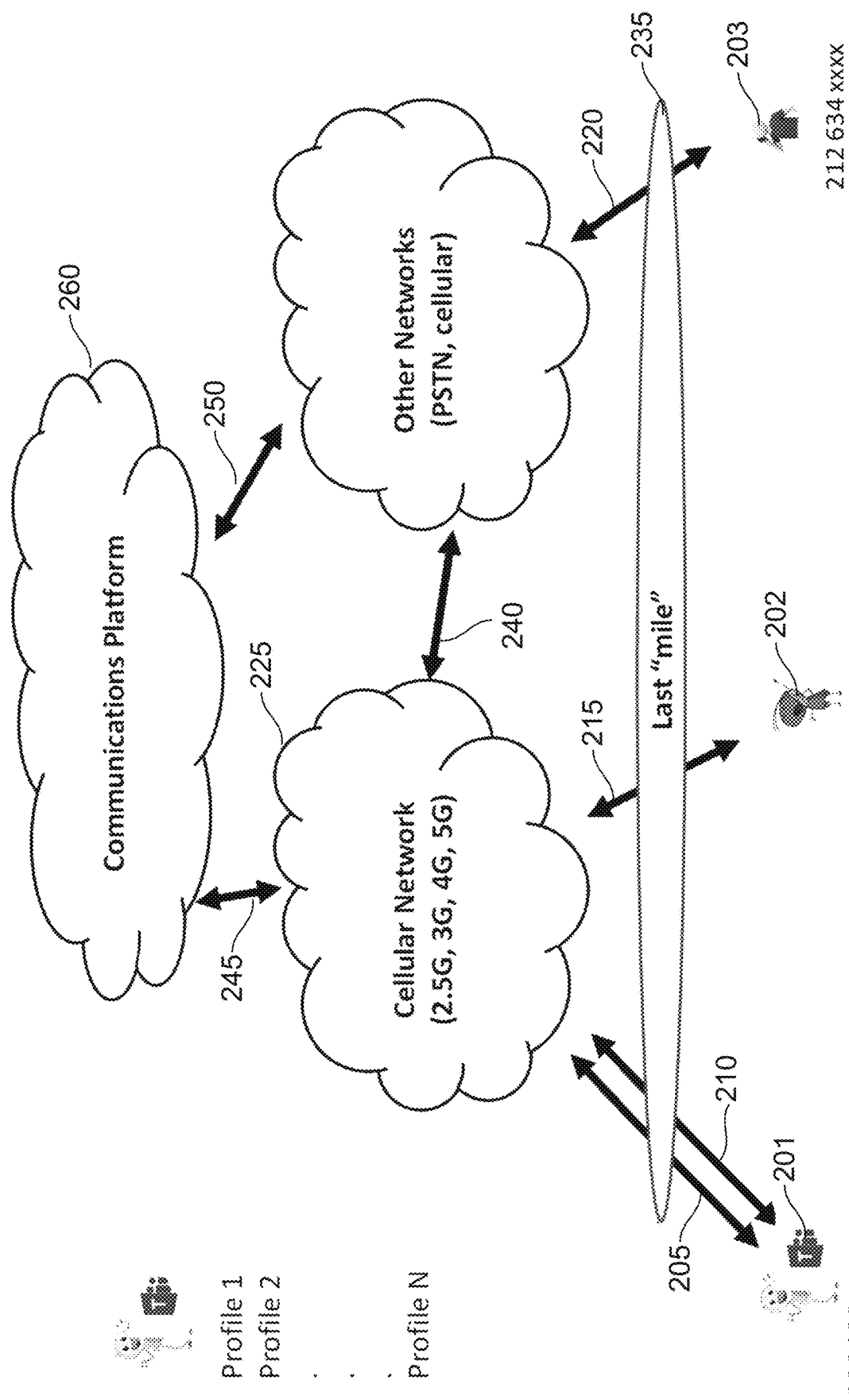
FIG. 2 presents an example of an operating environment in which a user may initiate a communication session with another user via a communications platform.

FIG. 2 illustrates an example operating environment 200 in which includes client devices 201, 202, and 203, cellular network 225, other network(s) 230, and last mile infrastructure 235. The example operating environment 200 also includes communications platform 260. The user devices 201, 202, and 203 may be similar to those discussed in the preceding example. Furthermore, the cellular network 225, the other network(s) 230, and the last mile infrastructure 235 may be similar to those discussed in the preceding example.

The communications platform 260 may facilitate communication sessions among users. A communication session may include voice calls, video calls, text messaging sessions, or a combination thereof. The communications platform 260 may also facilitate file sharing and application integration for creating, modifying, and sharing content among users. The communications platform 260 may be a service provider that supports communication sessions for subscribers. In other implementations, the communications platform 260 may be a service offered by a corporation that facilitates communication between employees of the corporation and may be used by employees of the corporation to communicate with third parties outside of the corporation. The communications platform 260 may be cloud-based system that is implemented on a network of servers hosted on the Internet is accessible to user devices, such as user devices 201, 202, and 203 over a network connection.

The user device 201 may include a communications application that is configured to operate in conjunction with the communications platform 260 to provide communication services to the user of the user device 201. The application may be assigned a telephone number that can be used to contact the user of the user device 201. In some instances, the user of the user device 201 may have multiple devices on which the communication application may be installed. For example, the user may have a version of the communication application installed on their mobile phone, a version installed on their tablet computer, and another version installed on their laptop computer. The communication application can provide a user interface in which the user can provide login information and/or other authentication credentials, which can be used to authenticate the user with the communications platform 260. The communication application on each of these devices may be associated with the same telephone number or unique identifier associated with the user. Where the user has multiple user devices that each have the communication application installed, the communications platform 260 can be configured to determine which device to route an incoming call to based on user activity on the device, a profile associated with the user, and/or other criteria. The telephone number associated with the application may be assigned by an administrator of the communications platform 260. For example, where the communications platform 260 is associated with a corporation, a network administrator for the corporation may assign a telephone number to the application from a pool of available numbers associated with the corporation. In implementations where the communications platform 260 is a subscription service provider, an administrator may assign a number to the subscriber from a pool of available numbers associated with the service provider.

Figure 4:
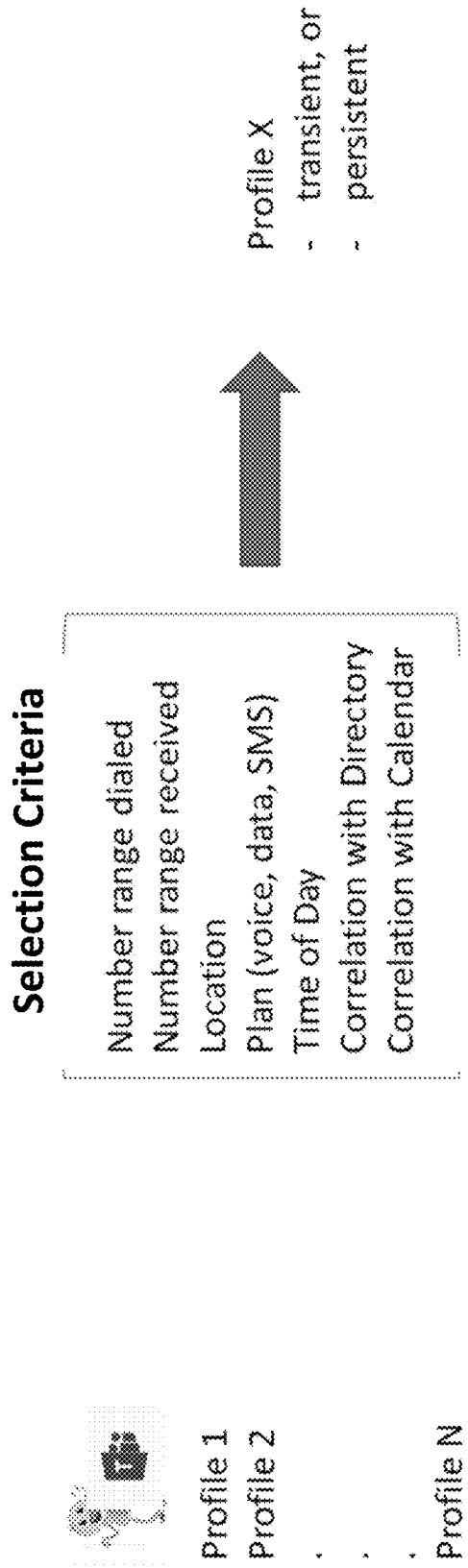
FIG. 4 presents an illustration of an example profile and profile contextual information.

A user of the communications platform 260 may be associated with one or more profiles. A profile includes configuration information that can be used the communications platform 260 to determine how to handle certain aspects of a communication session for the user. Each profile may be used under certain circumstances. A user may, for example, have a profile associated with personal communications, a profile associated with client communications, a profile associated with non-client work-related communications, and a profile for communications originating from certain geographical locations and/or untrusted networks. The examples are provided to illustrate some of the possible types of profiles that may be associated with a user. These examples are not intended to limit the types of profile that a user may have to these specific examples of a combination thereof. Each profile can include configuration information that indicates how the communication platform will handle a communication session for which that profile is selected. An example of some of the types of information that may be included in a profile is illustrated in FIG. 4, which is discussed in detail in the examples that follow.

The user device 201 includes the communication application associated with the communications platform 260, and thus, may have two telephone numbers associated with the device. The first telephone number may be associated with the cellular network 225, and the second telephone number may be the telephone number associated with the communications application associated with the communications platform 260. If the user initiates a conventional call via an application on the user device 201, which may be referred to as a "native dialer" application, a call request signal is routed to the cellular network 225 via the first wireless link 105, and the call request is processed in a similar fashion as discussed in the preceding example. However, if the user initiates a call via the communications application associated with the communications platform 260 from the user device 101, the call request may be treated as data and routed to the cellular network 225 as data over the second data link 210. The call via the communications application may, for example, utilize Session Initialization Protocol (SIP), H.323, or another Voice over Internet Protocol (VoIP) messaging protocol to send the call request. The call request signal can include an originating number is telephone number associated with the communications application on the user device 101. The cellular network 225 can be configured to determine that the originating number is associated with the communications platform 260 and route the call request to the communications platform 260 via connection 245. The connection 245 may be over the Internet and/or over one or more other networks.

The communications platform 260 can process the call request signal and extract dialed number information to determine how the call request should be processed. How the call should be processed may be determined at least in part on a profile associated with the user of the user device 101. The profile may indicate that the call should be routed through the communications platform 260 for various reasons. The communications platform 260 may be provided by a corporation, and the call may be determined to be business related and thus should be routed through the communications platform 260. The communications platform may alternatively hand off the call to the cellular network 225 if, for example, the call is determined to be personal and the dialed number is that of the user device 202. Additional examples of how the communications platform 260 may handle the routing of calls will be discussed in greater detail in the examples the follow.

Figure 3:
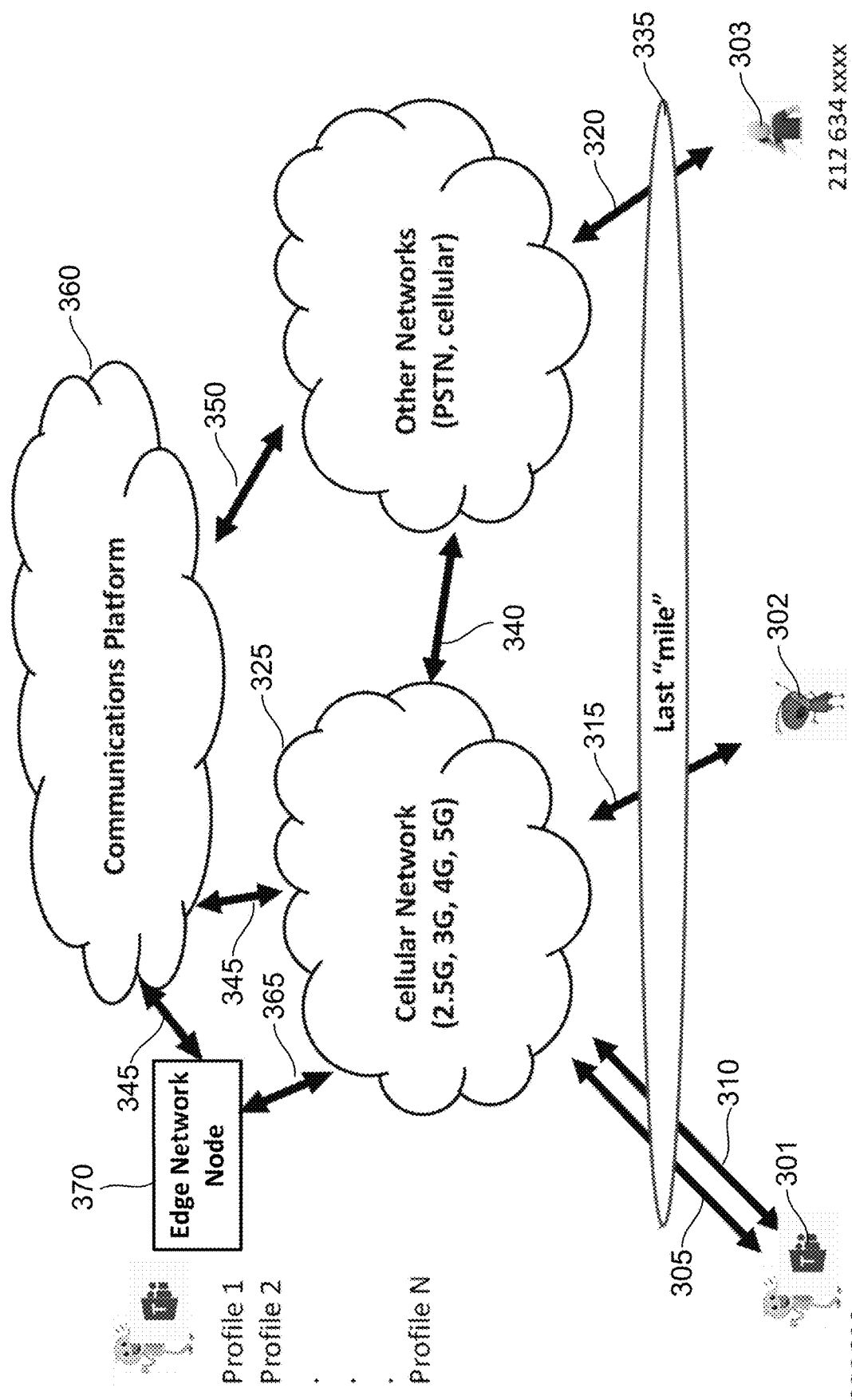
FIG. 3 presents another example of an operating environment in which a user may initiate a communication session with another user via a communications platform.

FIG. 3 illustrates an example operating environment 300 in which includes client devices 301, 302, and 303, a cellular network 325, other network(s) 330, last mile infrastructure 335, and communication platform 360. The example operating environment also includes edge network node 370. The user devices 301, 302, and 303 may be similar to those discussed in the preceding example. Furthermore, the cellular network 325, the other network(s) 330, and the last mile infrastructure 335 may be similar to those discussed in the preceding examples.

The communication platform 360 be associated with one or more edge network nodes that can handle tasks that would otherwise consume processing power of the communication platform 360, such as the edge network node 370. In the example illustrated in FIG. 3, the edge network node 370 can make profile selection decisions on behalf of the communication platform 360. By distributing this task to one or more edge network nodes, the communication platform 360 may utilize the processing and network resources that would be otherwise be dedicated to profile selection for handling of communication sessions. Other tasks, such as user authentication, may also be handed off to the edge network nodes to allow the communication platform 360 to utilize processing and network resources that would otherwise be dedicated to user authentication for other tasks. The edge network nodes may be distributed geographically, and a user device may be configured to connect with an edge network node that is located proximate to a location of the user device to reduce network latency associated with communicating with the communications platform 360.

The edge network node 370 can be configured to select a profile for a communication session. The edge network node 370 can receive a signal routed through the cellular network 325 that indicates that the application on the user device 301 is attempting to initiate a communication session via the communication platform 360. The edge network node 370 can select a profile from the profiles associated with the user using various criteria, such as those that are discussed in the examples that follow. The edge network node 370 can provide an indication to the user device 301 and the communication platform 360 of which profile was selected for the communication session, and the communication platform 360 can handle the communication session according to the selected profile.

FIG. 4 provides an example of some of the parameters that may be included in a profile. As discussed in the preceding examples, a user may be associated with multiple profiles that indicate how a communications platform, such as the communications platforms 260 or 360 of the preceding examples, should handle a communication session for which that profile is selected. A profile may have two aspects: profile configuration information and profile contextual information. The profile configuration information defines a set of parameters that the communications platform sets when handling the communication session. The profile contextual information defines a set of information that defines situations (a "context") in which the selection of that profile is appropriate. In some implementations, a network administrator may define a set of profiles associated with a user. In a corporate environment where the communication platform is a service offered to employees, the network administrator may a set of profiles based on a role of a user within the organization. In implementations where the communication platform is offered as a subscription service, the network administrator may set up a set of profiles based on a subscription type associated with the user.

In the example profile illustrated in FIG. 4, the profile configuration information may include Caller Line Information (CLI) information, Quality of Service (QoS) information, network routing information, policy, and features permissions. These parameters can be used by the communication platform to set one or more parameters or settings used to establish a requested communication session via the communications platform.

The profile configuration information may include Caller Line Identification (CLI) information that will be displayed to a recipient of the call if that profile is selected. The CLI information may include a phone number and a name or other identifier of a calling party to a recipient of a call. The communications platform can be configured to determine which CLI information should be provided to a recipient of a call. By default, a telephone number and name associated with a calling device may be presented to the receiving party. However, in some instances, it may be desirable to provide alternate CLI information to the receiving party. For example, a user may be a front-line worker that deals with clients of their employer. The front-line work may have a client contact profile that can be selected when the user making a call to a client. The client contact profile may specify that CLI information that includes a number associated with the company, such as a phone number for a switchboard or contact number associated with the company. The CLI information may also include the name of the company. When a user places a call to a client using this profile, the client is presented with CLI information that indicates that the call originates with the company rather than the name and/or the number associated with the user originating the call. A user may also be associated with a personal profile that is selected with it is determined that the user is making a personal call. This profile may provide an actual name of the caller and a personal number with the user. These example profiles are intended to illustrate some of the examples of the types of profiles that may be associated with a user but are not intended to be exhaustive or to limit the profiles to the examples discussed herein.

The profile configuration information may include Quality of Service (QoS) information that specifies how the communication platform will provide network prioritization and allocate bandwidth to a communication session if that profile is selected. The communication platform may simultaneously handle numerous communication sessions and will need to decide which communication sessions with receive priority when allocating limited network resources and bandwidth. Certain profiles may specify that the communications platform provide a high QoS, while other profiles may only require low or medium QoS. For example, a first profile may be a client contact profile used by a front-line employee of a company to communicate with clients that requires a high QoS. The communication platform will prioritize network traffic and allocation of bandwidth to communication sessions associated with this user profile to ensure that the client communications have good audio and/or video quality and experience minimal lag. In contrast, a second profile may be personal contact profile that requires low QoS. The personal contact profile may be selected when a user makes a personal call unrelated to work or client communications. The communications platform may allocate less bandwidth to communications and assign a lower priority to network traffic associated with the communication session. Accordingly, the audio and/or video quality provided for the communication session may be poorer than that provided in the client contact profile example.

The profile configuration information may include network routing information. The network routing information can specify whether a call, video chat, or other communication associated with a communication session should be routed through the communication platform or through another network, such as a cellular network or a public switched telephone network (PSTN) if the profile is selected. For example, where the communications platform is associated with a corporation, work-related and client-related calls may be associated with a profile that requires the calls to be routed through the communications platform to ensure that the communications platform can control access to features provided. However, where a call or other communication is personal, then a profile may be selected for personal calls that routes the calls through another network, such as a cellular network or PSTN rather than through the communications platform.

The profile configuration information may include policy information. A policy may be used to control whether a user may access certain features, such as text-based chat, voice calling, and video calling, or certain aspects of these features. A profile can be used to group a set of features permissions together and can serve as a shortcut for assigning this set of features permission to users of the communications platform. The policy information can identify a policy that should be applied if the profile is selected for a communications session.

The profile configuration information may include features permissions information. The features permissions may be assigned individually in a user profile rather than being grouped together in a profile. For example, the profile may indicate that certain call forwarding features cannot be used if that profile is selected. The profile may also define whether Auto Attendant may be used to transfer callers to an extension without going through a telephone operator. These features may be in addition to features that are assigned to a user via a profile. Where features permissions which are individually assigned to a profile contract those associated with a policy associated with the profile, the communications platform can be configured to use the individually assigned features permissions and to ignore the feature permissions that contradict the individually assigned features permissions. For example, a network administrator may assign a general user policy to a profile that prohibits the use of video calling. However, a supervisor profile may include a feature permission that overrides the general user policy and permits the use of video calling. This example is intended to illustrate one way in which a features permission may be used and is not intended to limit the scope of the features permissions and policies to this specific example.

A profile may also be associated with profile contextual information that can be used to determine when that particular profile may be selected from a set of profiles associated with a user. The profile contextual information may be used by a server associated with the communications platform, a user device, or by an edge node to select a profile to be used for a communication session. In some implementations, the profile contextual information may be used by the device selecting the profile for the communication session to determine a "context" for the communication session. The context can be understood to be at least in part a relationship or association between the caller and a called party in a communication session. For example, the caller may be calling a client, a work colleague, a family member, a friend, a service provider, or other party with some relationship or association to the caller. The context of a communication session may be derived from the profile contextual information discussed in the examples that follow. This context can be used to determine an appropriate profile to be used to by the communications platform to determine how to handle the communications session.

The profile contextual information may include one or more of the following types of information: a dialed telephone number, a range of telephone numbers, location, service plan (voice, data, SMS), and time of day. These examples illustrate just a few of the types of profile contextual information that might be associated with a profile. However, this example is not intended to limit the contextual information to these specific examples.

One type of profile contextual information that may be used to determine a context for a particular communication session is a dialed telephone number. A profile may have a set of one or more telephone numbers associated with that profile. If a caller calls one of these numbers, then that profile may be selected. The set of telephone numbers may be defined as one or more ranges of numbers. A range of telephone number numbers may be defined based on country code, an area or region code, local exchange number, and/or other range of telephone numbers that may be associated with a particular region. A range of telephone numbers may also be defined that are associated with a particular entity, such as a government entity, a corporation, or other entity. If a dialed number falls within a range of telephone numbers associated with a particular entity, then the profile associated with that entity may be selected.

The profile contextual information may also include location-based information, including but not limited to a location of the user device from which the call originates (also referred to herein as an "originating device"), a location of the user device being contacted (also referred to herein as a "target device"), or both. The location-based profile contextual information can be used to implement geographical restrictions based on the location of the user device from which the call originated, the target device, or both by associating geographical areas with profiles that either restrict or permit the usage of certain call features. Trusted geographical locations, such as a corporate headquarters, may be associated with a profile that provides access to a larger set of call features and high QoS. In contrast, public spaces or spaces defined as untrusted geographical locations, may be associated with a profile that provides access to a limited set of features and low QoS.

The location-based contextual information may also specify restrictions on an originating network, a target device network, or both. For example, information identifying a network to which the user device originating the call, the target device, or both may be obtained by the communications platform when determining a context for the communications session. In some implementations, the user devices may include a communications application associated with the communication platform installed on the devices, and the communications application may supply the network information to the communication platform so that the communication platform can locate and route calls to the user devices. Different profiles may be set up to provide different sets of features and QoS based on the network to which a user device is connected. Profile context information can be associated with each profile that indicates when that profile should be selected based on the network information. For example, where the user device(s) are connected to a trusted corporate network, a profile providing the highest level QoS, and broadest set of features may be selected. In contrast, when one or both users are connected via an untrusted or public network, a profile providing a low QoS and a limited set of features may be selected to limit potential exposure of sensitive information.

The profile contextual information may also include time-based contextual information, including but not limited to a time of day at the location of the originating device, time of day at a location of the target user device being contacted, or both. The profile contextual information may define typical business hours at the location of the originating device, the target device, or both. A business-related profile may provide a higher service quality and broader set of features to calls falling with business hours at the location of the originating device or the target device. In another example, an administrator of the communication platform may define peak and off-peak profiles by adding time-based contextual information to the profiles that indicate when the profiles should be selected. The peak profiles may limit the use of certain features that require high bandwidth and network resources during peak hours, and the off-peak profiles may permit additional high bandwidth features to be utilized but may not provide QoS guarantees for those features.

The profile contextual information may also include an indication of a type of relationship or association between the calling party and the called party for which a particular profile may be selected. A user may have a plurality of associated profiles that define different profile contextual information that indicates when each of these profiles may be selected. For example, the user may have a first profile in which the profile contextual information indicates that the profile should be selected for client-related communication sessions, a second profile in which the profile contextual information indicates that the profile should be selected for communication sessions between work colleagues, and a third profile in which the contextual information indicates that the profile should be selected for personal communication sessions. The communications platform or other entity deciding as to which profile to select for a particular communications session, may analyze information associated with the calling party, the called party, or both to determine a context for the communications session. For example, a dialed number may be correlated with a directory entry or contact entry, a calendar entry, or both to determine how the calling party and the called party are related or associated with one another.

The following example illustrates these concepts: a network administrator may set up the following set of profiles for a front-line employee that interacts with clients: (1) client-contact profile, (2) a corporate-internal profile; (3) a corporate priority profile; (4) a personal profile; and (5) a travel profile. The client-contact profile may be associated with a dialed number or range of numbers that are associated with clients, a set of geographical locations of the target devices, a set of geographical locations of the originating device, and a set of business hours associated with the client device. The corporate-internal profile may be associated with a range of numbers that are included in a corporate or organizational directory associated with the user. The corporate priority profile may be associated with a subset of the corporate or organization directory that are high level managers and executives of the corporation. The communications platform may determine a context for a particular communications session based on contact information, directory information, and/or calendar information associated with either caller and/or the called party. This information can be used to determine a relationship or association between the caller and the called party, and a profile can be selected based at least in part on this relationship or association.

The example implementations that follow discuss how a profile may be selected for a user for a particular communication session. In some implementations, the communications platform 260 or 360 may select which user profile should be used in a server-based approach. In other implementations, a client-based approach is used, which the communications application on the user device may make the determination as to which profile to select. In yet other implementations, the communications platform 260 or 360 may temporarily delegate the responsibility for selecting the profile to the communications application on the user device under certain circumstances. In yet another approach, an edge network node, such as edge network node 370, may select which profile is to be used for a communication session.

Server-Based Profile Selection

Figure 5:
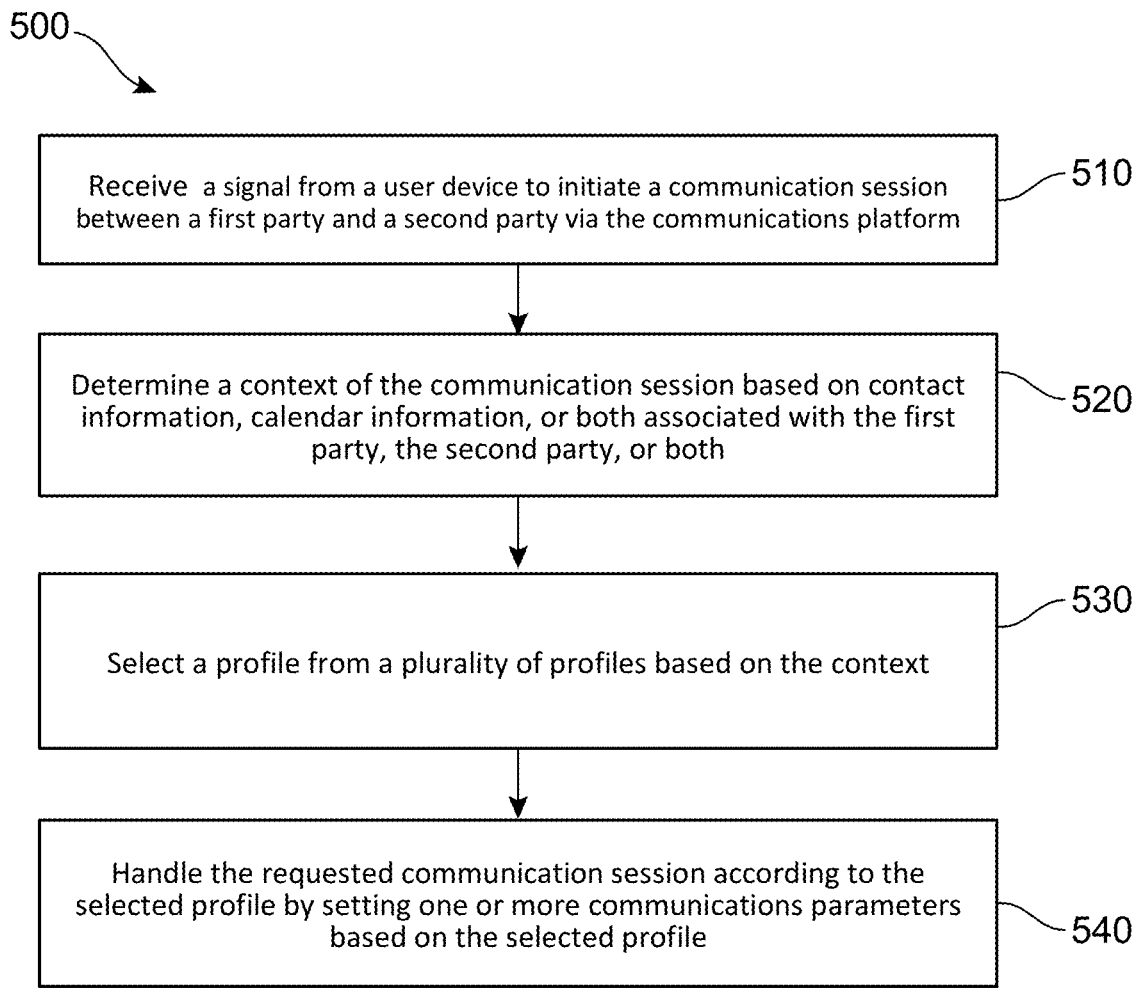
FIG. 5 presents a flowchart of an example process for selecting at a communication platform a profile to be used by the communication platform for handling a communication session.

FIG. 5 is a flow chart illustrating an implementation of an example process 500 executed by a data processing system for selecting a profile to be used by a communication platform for handling a communication session. In some examples, some or all of the process 500 may be performed in combination with any of the features discussed in connection with FIGS. 1-4. The process 500 may be implemented by a data processing system, such as the communication platform described in the proceeding examples or the example software architecture 900 illustrated in FIG. 9 and/or the example machine 1000 illustrated in FIG. 10. The process 500 is a server-based profile selection solution in which the communication platform determines which profile is to be used in the communication session.

The process 500 may include a first operation 510 in which a signal is received from a user device to initiate a communication session via the communication platform. Referring to the example illustrated in FIG. 2, the user of the user device 101 may initiate a call via the communications application on the user device. The mobile application is associated with the communications platform 260 and can send a request to establish a communication session with another user, such as the user of user device 202 or the user device 203. The signal comprising the request to establish the communication session is received by the communications platform 260. The signal may be routed through one or more intermediate networks, such as cell network 225. The one or more intermediate networks may determine that the signal should be routed to the communications platform 260 based on a telephone number associated with the communications application on the user device 201. As discussed in the preceding examples, the telephone number associated with the user application may be mapped or assigned to the communication platform, and the one or more intermediate networks can be configured to access mapping information to determine where to route the signal. In other implementations, a network address and/or other information included in the request signal may be used to route the signal from the user device 201 to the communications platform 260.

The process 500 may include a second operation 520 that includes determining a context of the communication session based on contact information, calendar information, or both associated with the first party, the second party, or both. The context of the communication session may be indicative of a relationship or association between the caller and the called party, which may be derived from the contact information and calendar information. The context of the communication session may, for example, indicate that the communication session is work-related, client-related, or personal in some implementations. The communications platform can use this context information to select an appropriate profile for handling the communications session.

Contact list information is one source of information that may be used to determine a context for a communication session. A user may be associated with a contact list. The contact list includes contact list entries that identify a party with whom the user may interact or has interacted with in the past. A contact list entry may include one or more telephone numbers, fax numbers, screen names, social media identifiers, email addresses, or other means through which the user may communicate the contact. A contact list entry may include information that identifies a relationship or association between the party in the contact list and the user who is associated with the contact list. For example, the contact list entry may indicate that that a contact list entry is a friend, family member, or other personal entry. The contact list entry may alternatively indicate that a contact is a work-related or client-related entry. In some implementations, the contact list entry may not include an express indication of the relationship or association between the user and the contact. However, the communications platform may infer whether the contact is a personal contact, work contact, client contact, or other type of contact based on the information included in the contact list entry. For example, an entry that includes a home number or personal mobile number may be inferred to be a personal contact, while an entry that only includes a work number associated with a switchboard of a corporation may be inferred to be a client contact. The communications platform may correlate the contact information included in the contact list entry with an organizational directory for a corporation or organization at which the user is employed to determine whether a contact is a work-related contact.

Calendar information is another source of information that may be used to determine a context for a communication session. A user may have calendar information that includes appointment and meeting information for the user, and the user may have multiple calendars. For example, a user may have a personal calendar in which personal appointments, meeting, and events may be scheduled, and a work-related calendar in which work-related appointments, meeting, and events may be scheduled. The appointment, meeting, and or event information may include information that is associated with one or both of the parties to the communication session. The communications platform may correlate a number associated with the caller (e.g. CLI information) and/or a dialed number associated with the party being called with calendar information of the caller, the called party, or both if available to determine whether there are any appointments, meetings, or event information that are associated with the caller's number or the dialed number.

The communications platform may determine a context for the communications session based on the correlated calendar information. If one or more entries on the work calendar correlate to the caller and/or called party, then the communications platform can infer that the context of the call is business-related, or if the one or more entries on the personal calendar correlate to the caller and/or called party, then the communications platform can infer that the context of the call is personal. The dates and times of the calendar entries may also be used by the communications platform to determine a context for the communications session. If the meeting, appointment, or event occurs outside of a predetermined set of working hours, falls on a weekend, or on a holiday, the communications platform may determine that the meeting, appointment, or event is likely personal, and the context of the communications session is determined to be personal.

The process 500 may include a third operation 540 that includes selecting a profile for the user from the plurality of profiles based on the context. As discussed in the preceding examples, the communications platform may associate a plurality of profiles with a user, and the communications platform may select a profile for use in the communication session based on the context determined in the previous step. For example, if the context for the communications session is determined to be business-related, then a profile having profile contextual information indicating that the profile is for business-related communications sessions may be selected. In contrast, if the context for the communications session is determined to be personal, then a profile having profile contextual information indicating that the profile is for personal communications sessions may be selected. Other types of relationships or associations between the parties may be defined in other implementations. In implementations where more than one profile having profile contextual information matching that determined in the previous stage is associated with the user, other profile contextual information may be used, such as a dialed telephone number, a range of telephone numbers, location, service plan (voice, data, SMS), time of day may be used to select a profile from those that matched the context type.

The process 500 may include a fourth operation 540 that includes handling the requested communication session according to the selected profile by setting one or more communications parameters based on the selected profile. The communications platform 260 can establish the communication session based on the parameters of the profile selected in the preceding operation.

The communications platform 260 may first determine whether a selected feature or service associated with the request to establish the communication session is permitted according to the selected profile. For example, if a video call was requested, but that feature service is not supported under the selected profile, then the communications platform 260 may send a signal to the user device of the user that originated the request to establish the communication session indicating that the requested service is not supported. Such a situation may occur, for example, where the communication platform is a corporate communication platform, and the user has attempted to access services that user is not permitted to access, or the user has attempted to make a call to a personal contact and has requested services that that are not accessible for non-work related communication sessions. The corporation may not want to allocate network resources and bandwidth for services unrelated to the user's role at the corporation, and thus prevent users from using those features where the context of the communication session is determined to be personal. In other implementations, the communications platform 260 may be a subscription service, and the user may have requested a service that is unavailable to that subscriber or unavailable under certain conditions (e.g., video calling permitted only during non-peak hours during the week and on weekends according to the user's subscription).

If the request for the communication session was a request to establish a voice call, then the communications platform 260 may determine a target number associated with the requested communication session and route the call to a network associated with the target number. The communications platform 260 may look up the dialed number in a database to determine which network is associated with the dialed number, and then route the call to the appropriate network. For example, the target number associated with user device 202 may be associated with the cellular network 225, and the communication platform may route the call back to the cellular network 225 for the cellular network 225 to establish the voice call with the user device 202. Similarly, the target number associated with the user device 203 may be associated with a network of the other network(s) 230, and the communications platform 260 may route the call to the other network(s) 230 to establish the voice call with the user device of the other user.

If the request for the communication session was a request to establish a video call and/or other type of communication session, such as a text messaging session, the communications platform 260 may determine a network associated with the target number and attempt to route the request to the appropriate network. The communications platform 260 may determine that the requested service may not be available for a particular target user device. For example, the user device 203 may be a landline telephone reachable through a PSTN of a telephony services provider for that landline telephone. The communications platform 260 may send a signal to the user device originating the request to establish the video call indicating that the request service is unavailable.

If the communications platform 260 can establish the communication session in response to the request, the communication platform can apply the configuration parameters to the communication session based on the selected profile. As discussed with respect to the example profile of FIG. 4, the configuration parameters may include CLI information, QoS information, policy information, and feature permissions. Other configuration information may be included in the profile in addition to or instead of one or more of examples discussed herein.

In some situations, it is possible that a new profile may be selected during a communications session that has already been established. One situation where this may occur is where a participant to the communication session invites a new user to participate in the already established communications session. The communications platform can be configured to redetermine the context for the communication session in response to the new user being invited to join the communication session. If the context changes as a result of the new user being added, the communications platform may select a new profile, and begin handling the communications session according to the newly selected profile.

Persistent User Device-Based Profile Selection

Figure 6:
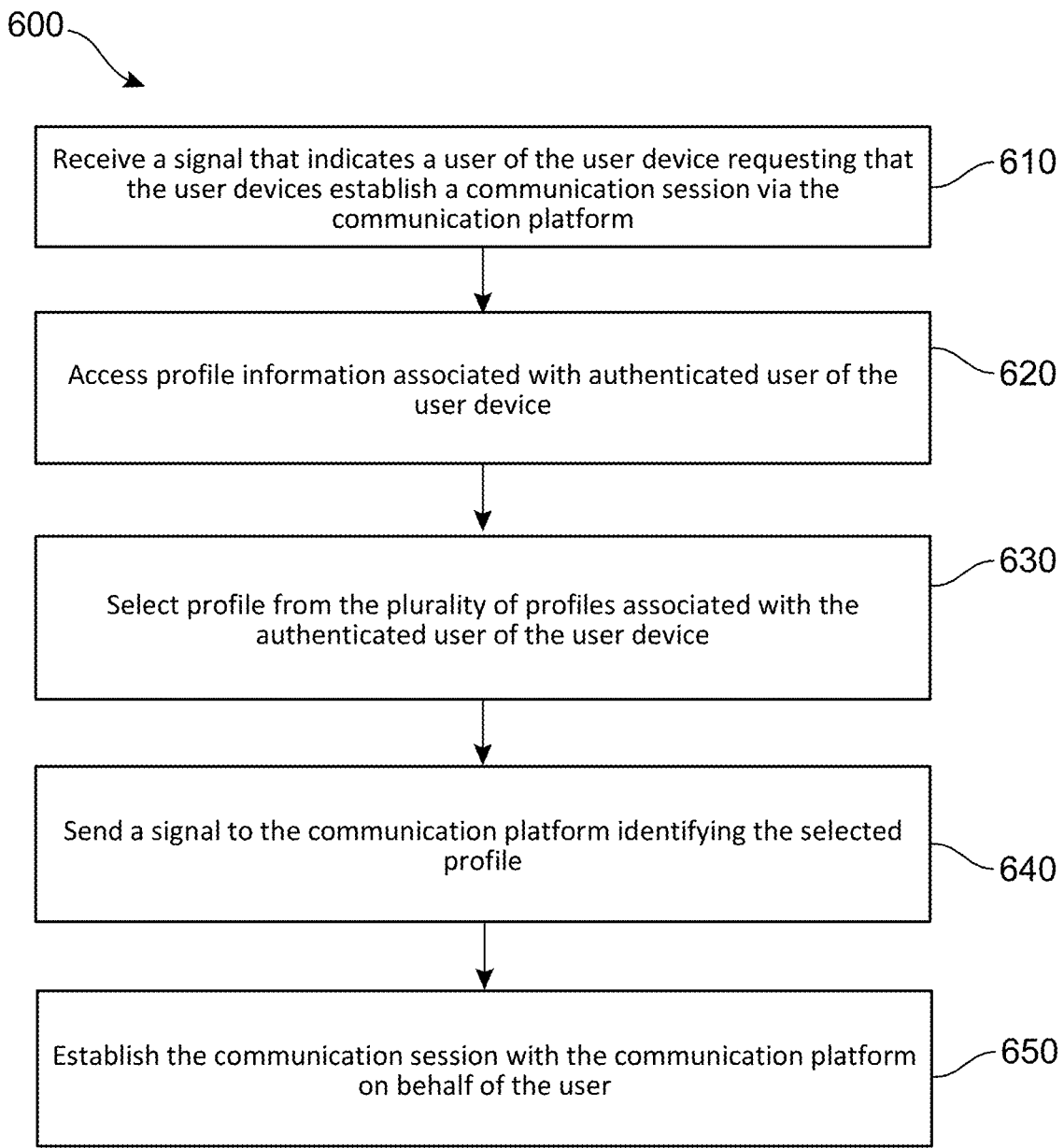
FIG. 6 presents a flowchart of an example process for selecting at a user device a profile to be used by the communication platform for handling a communication session.

FIG. 6 is a flow chart illustrating an implementation of an example process 600 executed by a data processing system for selecting a profile to be used by a communication platform for handling a communication session. In some examples, some or all of the process 600 may be performed in combination with any of the features discussed in connection with FIGS. 1-4. The process 600 may be implemented by a user device, such as the user devices described in the proceeding examples or the example software architecture 900 illustrated in FIG. 9 and/or the example machine 1000 illustrated in FIG. 10. The process 600 is a user device-based profile selection solution in which the user device determines which profile is to be used in the communication session. The communication platform may delegate the decision as to which profile to use for a communication session to the application on the client device on a permanent basis. Where the has more than one user device, the copy of the communications application on the user device being utilized by the user to initiate a communication session may make the determination as to which profile to use.

The process 600 may include a first operation 610 in which a signal is received from a user device to initiate a communication session via the communication platform. The user device may include a communications application associated with the communication platform as discussed in the preceding examples. A user may attempt to initiate a communication session via the application. For example, a user may access a user interface of the communications application and attempt to initiate a communication session with another party by entering the telephone number of the other party into the user interface, by selecting contact information for the other party from a directory or contact information.

The process 600 may include a second operation 620 in which profile information associated with the user is accessed. In this example, the communications application on the user device has access to the profile information associated with the user. As discussed in the preceding examples, the user can be authenticated with the communication platform via the communications application on the user device. In response to the user being authenticated, the communication profile may provide one or more profile associated with the authenticated user to the client device. In some implementations, the communication platform may send the profiles associated with the user to the communications application in response to the user being authenticated. In other implementations, the communications application on the user device may request the profiles from the communication platform in response to the user being authenticated.

The process 600 may include a third operation 630 in which the communications application of the user device can select a profile to be used for the communication session. As discussed in the preceding examples, the profile may be selected based on various criteria, including but not limited to a dialed number or range of numbers associated with the dialed number, the locations of the originating device and/or the target device, service plan information (voice, data, SMS), time of day at a location associated with the originating device and/or the target device, correlation of the dialed number with a directory entry and/or a calendar entry may also be used by the communication platform to select a profile from the plurality of profiles. The communications application may determine a context of the communication session based on one or more of these criteria as discussed in the preceding examples and select the profile for the communication session based on this context.

The process 600 may include a fourth operation 640 in which the communications application of the user device can send a signal to the communication platform identifying the selected profile. The communications application of the user device can send a message to the communication platform to notify the communication platform that a particular profile was selected by the user device. The communications application may send an indicator identifying the selected profile to the communication platform. The communication platform may alternatively send the profile or a subset thereof to the communication platform. The communication platform can use the selected profile to handle the communication session on behalf of the user as discussed in the preceding examples.

The process 600 may include a fifth operation 650 in which the communications application on the user device establishes a communication session with the communication platform. The communications application on the user device can establish a communication session with the communication platform according to the preceding examples. The communication platform may coordinate the setup of one or more voice, data, and/or text communication sessions with one or more other users according to the selected profile.

In some situations, it is possible that a new profile may be selected during a communications session that has already been established. One situation where this may occur is where a participant to the communication session invites a new user to participate in the already established communications session. The communications platform may send a signal to the user device redetermine the selected profile for the communication session in response to the new user being invited to join the communication session. If the profile changes as a result of the new user being added, the user device may send a signal to the communications platform identifying the newly selected profile, and the communications platform can begin handling the communications session according to the newly selected profile.

Transient User Device-Based Profile Selection

Figure 7:
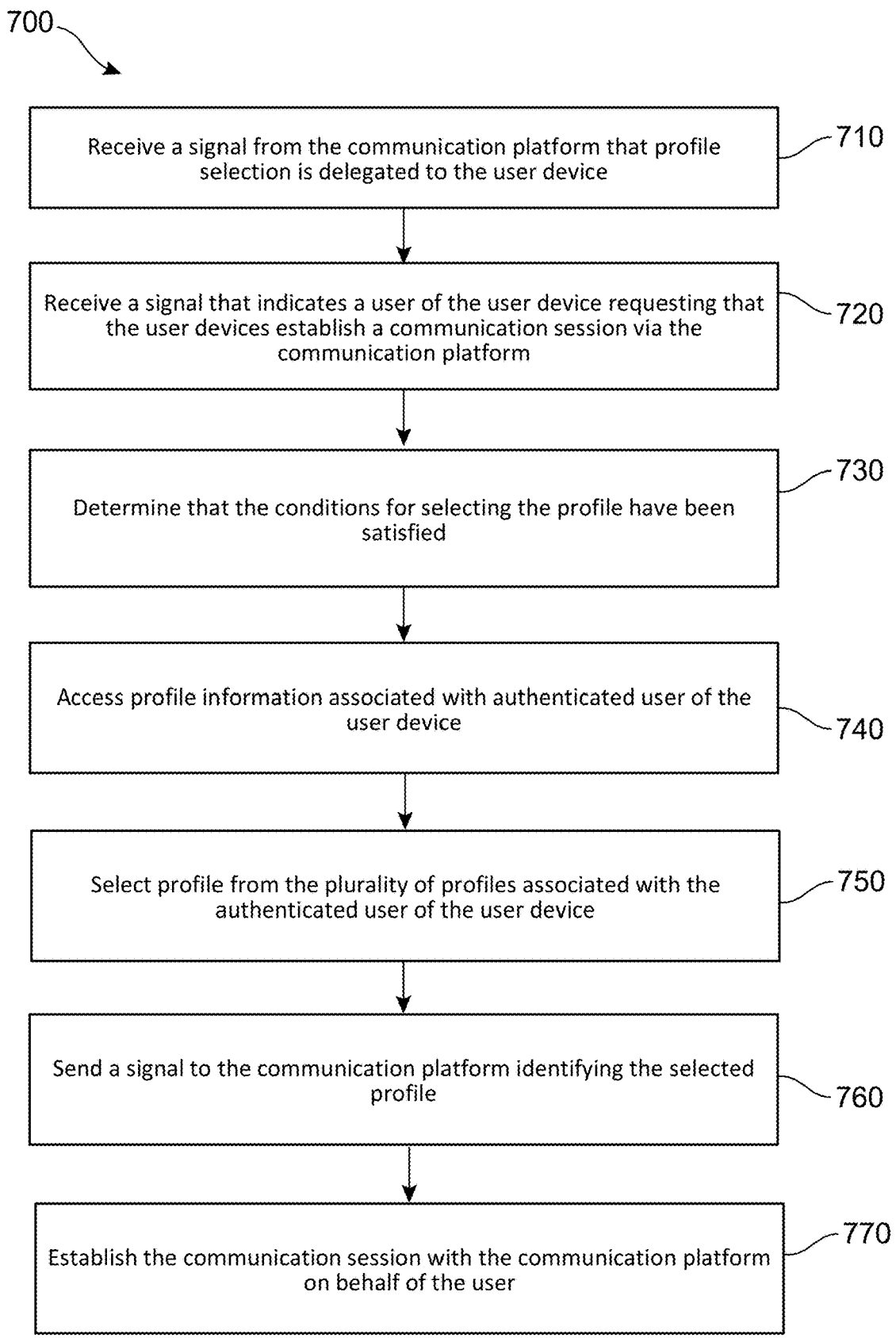
FIG. 7 presents a flowchart of an example process for selecting at a user device a profile to be used by the communication platform for handling a communication session.

FIG. 7 is a flow chart illustrating an implementation of an example process 700 executed by a data processing system for selecting a profile to be used by a communication platform for handling a communication session. In some examples, some or all of the process 700 may be performed in combination with any of the features discussed in connection with FIGS. 1-4. The process 700 may be implemented by a user device, such as the user devices described in the proceeding examples or the example software architecture 900 illustrated in FIG. 9 and/or the example machine 1000 illustrated in FIG. 10. The process 700 is a user device-based profile selection solution in which the user device determines which profile is to be used in the communication session. In this example, the communication platform may delegate the decision as to which profile to use for a communication session to the application on the client device under certain circumstances. The communication platform can provide delegation criteria to the user device to indicate under which circumstances that the user device is responsible for profile selection. Where the has more than one user device, the copy of the communications application on the user device being utilized by the user to initiate a communication session may make the determination as to which profile to use, and the delegation criteria may be provided to the communications application on each of the user devices.

The process 700 may include a first operation 710 in which a first signal is received from the communication platform indicating that profile selection is delegated to the user device according to delegation criteria. The predetermined criteria may include one or more of: (1) the user device being located at one or more predetermined locations, (2) the user device is delegated the ability to perform profile selection for a limited period of time, (3) the user device is delegated the ability to perform profile selection according to a deferral schedule (which may define predetermined intervals at which the user device is delegated the ability to perform profile selection; and (4) responsive to a profile request time out when requesting profile selection from the communication platform and/or edge network node. The communication platform may periodically provide delegation information to the user device via a network connection between the user device and the communication platform. The communication platform may periodically push the delegation criteria to the user device(s) associated with a user. In some implementations, the communication platform may provide the delegation information to the user device in response to the user being authenticated with the communication platform. The communications application may store the delegation criteria in a persistent memory of the user device and access the delegation criteria in response to the user attempting to establish a communication session with the communication platform via the communications application on the user device.

The process 700 may include a second operation 720 in which a second signal is received from a user device to initiate a communication session via the communication platform. The user device may include a communications application associated with the communication platform as discussed in the preceding examples. A user may attempt to initiate a communication session via the application. For example, a user may access a user interface of the communications application and attempt to initiate a communication session with another party by entering the telephone number of the other party into the user interface, by selecting contact information for the other party from a directory or contact information.

The process 700 may include a third operation 730 in which a determination that the delegation conditions for determining the profile to be used for the communication session at the user device are satisfied. The communication platform conditionally delegated profile selection to the user device under certain conditions, if the conditions defined in the delegation criteria are not met, the communication platform may instead select the profile to be used to handle the communication session, and the process illustrated in FIG. 5 may instead be used to select the user profile. Otherwise, the process 700 may continue with step 740 if one or more of the conditions of the delegation criteria are met.

The process 700 may include a fourth operation 740 in which profile information associated with the user is accessed. In this example, the communications application on the user device has access to the profile information associated with the user. As discussed in the preceding examples, the user can be authenticated with the communication platform via the communications application on the user device. In response to the user being authenticated, the communication profile may provide one or more profile associated with the authenticated user to the client device. In some implementations, the communication platform may send the profiles associated with the user to the communications application in response to the user being authenticated. In other implementations, the communications application on the user device may request the profiles from the communication platform in response to the user being authenticated.

The process 700 may include a fifth operation 750 in which the communications application of the user device can select a profile to be used for the communication session. As discussed in the preceding examples, the profile may be selected based on various criteria, including but not limited to a dialed number or range of numbers associated with the dialed number, the locations of the originating device and/or the target device, service plan information (voice, data, SMS), time of day at a location associated with the originating device and/or the target device, correlation of the dialed number with a directory entry and/or a calendar entry may also be used by the communication platform to select a profile from the plurality of profiles. The user device may determine a context of the communication session based on one or more of these criteria as discussed in the preceding examples and select the profile for the communication session based on this context.

The process 700 may include a sixth operation 760 in which the communications application of the user device can send a signal to the communication platform identifying the selected profile as discussed in the preceding examples.

The process 700 may include a seventh operation 770 in which the communications application on the user device establishes a communication session with the communication platform as discussed in the preceding examples.

In some situations, it is possible that a new profile may be selected during a communications session that has already been established. One situation where this may occur is where a participant to the communication session invites a new user to participate in the already established communications session. The communications platform may send a signal to the user device redetermine the selected profile for the communication session in response to the new user being invited to join the communication session. If the profile changes as a result of the new user being added, the user device may send a signal to the communications platform identifying the newly selected profile, and the communications platform can begin handling the communications session according to the newly selected profile.

Edge Network Node-Based Profile Selection

Figure 8:
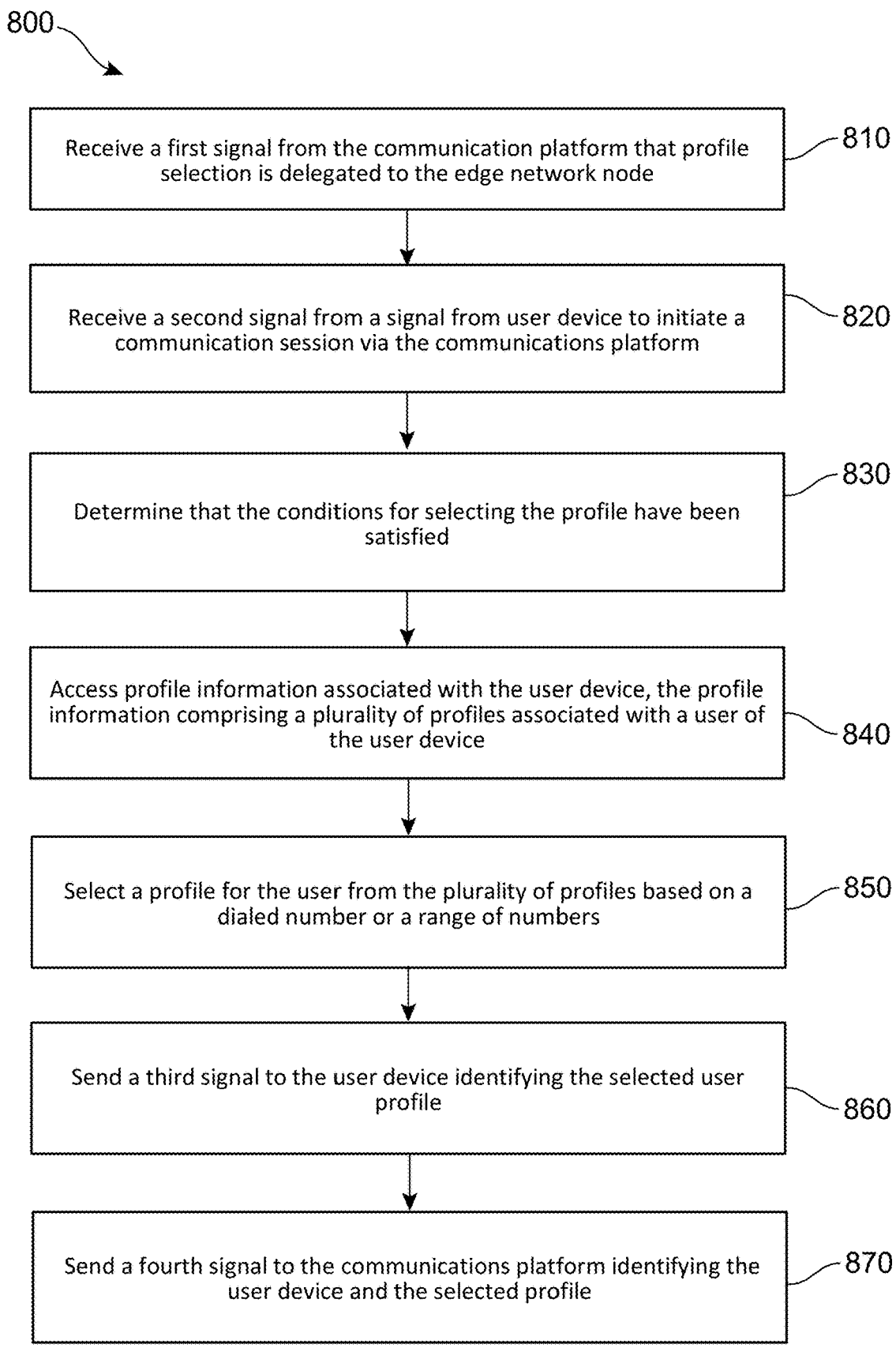
FIG. 8 presents a flowchart of an example process for selecting at an edge network node a profile to be used by the communication platform for handling a communication session.

FIG. 8 is a flow chart illustrating an implementation of an example process 800 executed by a data processing system for selecting a profile to be used by a communication platform for handling a communication session. In some examples, some or all of the process 800 may be performed in combination with any of the features discussed in connection with FIGS. 1-4. The process 800 may be implemented by an edge network node, such as the edge network node 370 described in the proceeding examples or the example software architecture 900 illustrated in FIG. 9 and/or the example machine 1000 illustrated in FIG. 10.

The process 800 is an edge network node-based profile selection solution in which the edge network node determines which profile is to be used in the communication session. In this example, the communication platform may delegate the decision as to which profile to use for a communication session to the edge network node under certain circumstances, while in other implementations, the communication platform may delegate profile selection to the network node without any limitations. The communication platform can provide delegation criteria to the edge network node to indicate under which circumstances that the edge network node is responsible for profile selection.

The process 800 may include a first operation 810 in which a first signal is received from the communication platform indicating that profile selection is delegated to the edge server according to delegation criteria. The delegation criteria may be similar to that discussed in the preceding example and may provide an indication of the conditions under which the edge network node is delegated the responsibility of profile selection by the communication platform.

This stage may be omitted in implementations where the communications platform delegates all profile selection to the edge network node.

The process 800 may include a second operation 820 in which a signal is received from a user device to initiate a communication session via the communication platform. Referring to the example illustrated in FIG. 3, the user of the user device 301 may initiate a call via the communications application on the user device. The mobile application is associated with the communication platform 360 and can send a request to establish a communication session with another user, such as the user of user device 302 or the user device 303. The signal comprising the request to establish the communication session is received by the edge network node 370. The signal may be routed through one or more intermediate networks, such as cell network 325. The one or more intermediate networks may determine that the signal should be routed to the edge network node 370 based on a telephone number associated with the communications application on the user device 301. As discussed in the preceding examples, the telephone number associated with the user application may be mapped or assigned to the communication platform, and the one or more intermediate networks can be configured to access mapping information to determine where to route the signal. In other implementations, a network address and/or other information included in the request signal may be used to route the signal from the user device 301 to the communications platform 260.

The process 800 may include a third operation 830 in which a determination that the delegation conditions for determining the profile to be used for the communication session at the user device are satisfied. This operation is omitted where the communications platform delegates all profile determination decisions to the edge network node. If the communication platform conditionally delegated profile selection to the user device under certain conditions, and the conditions defined in the delegation criteria are not met, the communication platform may instead select the profile to be used to handle the communication session, and the process illustrated in FIG. 5 may instead be used to select the user profile. Otherwise, the process 800 may continue with step 840 if one or more of the conditions of the delegation criteria are met.

The process 800 may include a fourth operation 840 in which profile information associated with the user is accessed. The edge network node 370 may access a database of profile information maintained by the communication platform to access the profile information for the user requesting the communication session to be established. As discussed in the preceding examples, the profiles may be associated with a telephone number and/or other identifier associated with the user. The edge network node 370 may maintain a local copy of the profile database for at least a subset of the users of the communication platform to reduce latency associated with accessing the database remotely. The local copy of the profile database may include profile information for users that are authorized to utilize the edge network node. For example, the edge network node may be associated with users from a particular geographical area, a particular office of a corporation, or other such subsets of users of the communication platform.

The process 800 may include a fifth operation 850 in which the edge network node may select a profile to be used for the communication session. As discussed in the preceding examples, the profile may be selected based on various criteria, including but not limited to a dialed number or range of numbers associated with the dialed number, the locations of the originating device and/or the target device, service plan information (voice, data, SMS), time of day at a location associated with the originating device and/or the target device, correlation of the dialed number with a directory entry and/or a calendar entry may also be used by the communication platform to select a profile from the plurality of profiles. The edge node 370 may be configured to obtain location information and for the originating device from the device. Calendar and directory information may be stored in a database associated with the communication platform 360 that is accessible to the edge node 370. The edge node 370 may also be configured to request calendar and contact list information associated with a dialed number from the user device 301 that originated the request for the communication session. The edge network node may determine a context of the communication session based on one or more of these criteria as discussed in the preceding examples and select the profile for the communication session based on this context.

The process 800 may include a sixth operation 860 in which the edge network node may send a third signal to the user device identifying the selected user profile. The edge network node 370 may send a signal over a network connection to the user device 301 that includes an indication of the profile selected. In some implementations, the profile or a subset of the information included therein may be sent to the user device.

The process 800 may include a seventh operation 870 in which the edge network node may send a fourth signal to the communications platform identifying the user device and the selected profile. The edge network node 370 may send a signal over a network connection to the user device 301 that includes an indication of the profile selected. In some implementations, the profile or a subset of the information included therein may be sent to the communication platform.

The edge network node 370 may then route the request to establish a communication session to the communication platform 360 or provide an indication of the selected profile to the client device and/or the communication platform 360 and defer to the communications application on the user device 301 to route the request to establish the communication and the selected profile to the communication platform 360.

In some situations, it is possible that a new profile may be selected during a communications session that has already been established. One situation where this may occur is where a participant to the communication session invites a new user to participate in the already established communications session. The communications platform may send a signal to the edge network node to redetermine the selected profile for the communication session in response to the new user being invited to join the communication session. If the profile changes as a result of the new user being added, the edge network node may send a signal to the communications platform and the user device(s) identifying the newly selected profile, and the communications platform can begin handling the communications session according to the newly selected profile.

Examples of the operations illustrated in the flow charts shown in FIGS. 5-8 are described in connection with FIGS. 1-4. It is understood that the specific orders or hierarchies of elements and/or operations disclosed in FIGS. 5-8 are example approaches. Based upon design preferences, it is understood that the specific orders or hierarchies of elements and/or operations in FIGS. 5-8 can be rearranged while remaining within the scope of the present disclosure. FIGS.

5-8 present elements of the various operations in sample orders and are not meant to be limited to the specific orders or hierarchies presented. Also, the accompanying claims present various elements and/or various elements of operations in sample orders and are not meant to be limited to the specific elements, orders, or hierarchies presented.

The detailed examples of systems, devices, and techniques described in connection with FIGS. 1-8 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-8 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 9:
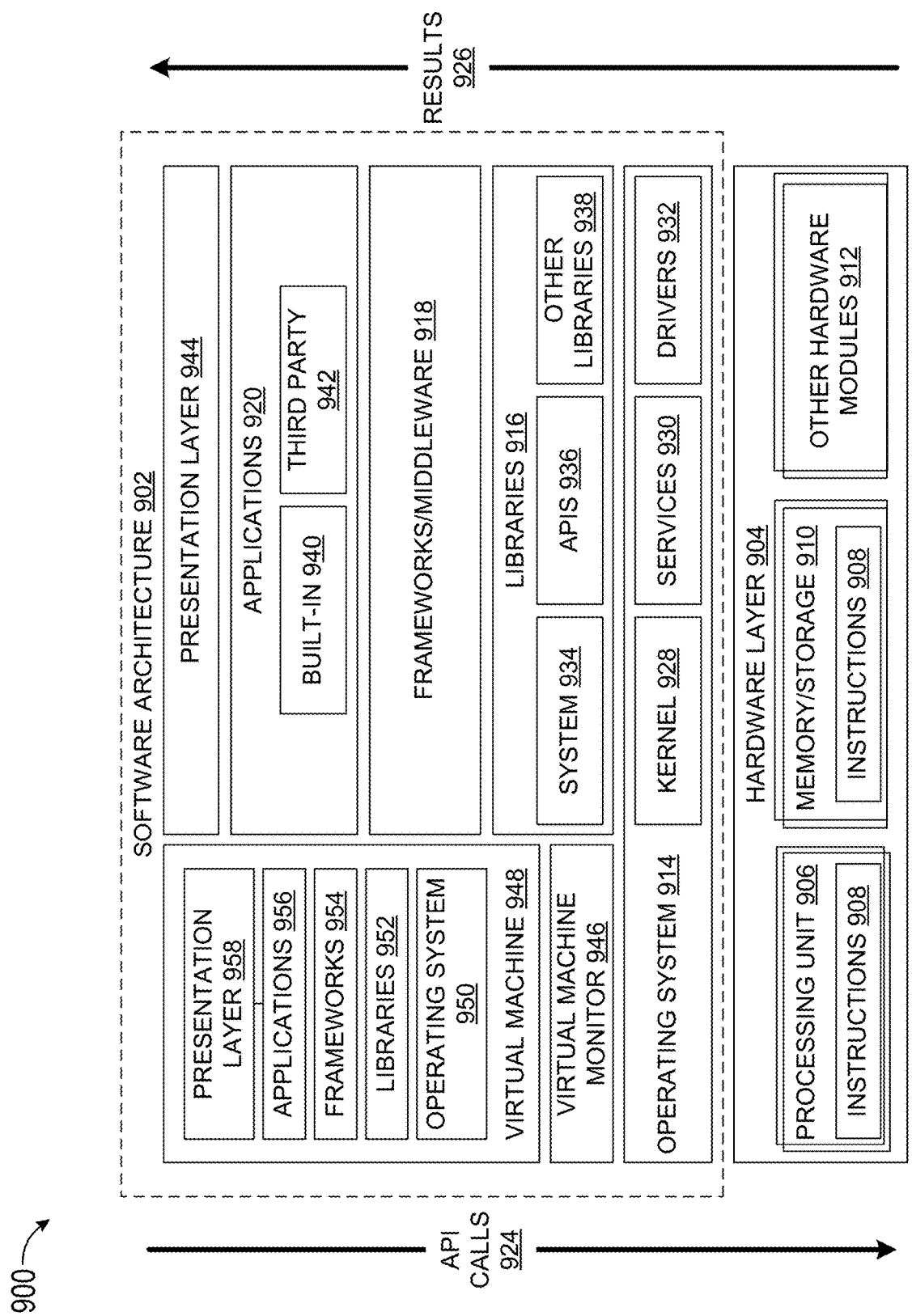
FIG. 9 is a block diagram illustrating an example software architecture, various portions of which may be used in conjunction with various hardware architectures herein described, which may implement any of the features herein described.

FIG. 9 is a block diagram 900 illustrating an example software architecture 902, various portions of which may be used in conjunction with various hardware architectures herein described, which may Implement any of the above-described features. FIG. 9 is a non-limiting example of a software architecture and it will be appreciated that many other architectures may be implemented to facilitate the functionality described herein. The software architecture 902 may execute on hardware such as a machine 1000 of FIG. 10 that includes, among other things, processors 1010, memory 1030, and input/output (I/O) components 1050. A representative hardware layer 904 is illustrated and can represent, for example, the machine 1000 of FIG. 10. The representative hardware layer 904 includes a processing unit 906 and associated executable instructions 908. The executable instructions 908 represent executable instructions of the software architecture 902, including implementation of the methods, modules and so forth described herein. The hardware layer 904 also includes a memory/storage 910, which also includes the executable instructions 908 and accompanying data. The hardware layer 904 may also include other hardware modules 912. Instructions 908 held by processing unit 908 may be portions of instructions 908 held by the memory/storage 910.

The example software architecture 902 may be conceptualized as layers, each providing various functionality. For example, the software architecture 902 may include layers and components such as an operating system (OS) 914, libraries 916, frameworks 918, applications 920, and a presentation layer 944. Operationally, the applications 920 and/or other components within the layers may invoke API calls 924 to other layers and receive corresponding results 926. The layers illustrated are representative in nature and other software architectures may include additional or different layers. For example, some mobile or special purpose operating systems may not provide the frameworks/middleware 918.

The OS 914 may manage hardware resources and provide common services. The OS 914 may include, for example, a kernel 928, services 930, and drivers 932. The kernel 928 may act as an abstraction layer between the hardware layer 904 and other software layers. For example, the kernel 928 may be responsible for memory management, processor management (for example, scheduling), component management, networking, security settings, and so on. The services 930 may provide other common services for the other software layers. The drivers 932 may be responsible for controlling or interfacing with the underlying hardware layer 904. For instance, the drivers 932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 916 may provide a common infrastructure that may be used by the applications 920 and/or other components and/or layers. The libraries 916 typically provide functionality for use by other software modules to perform tasks, rather than rather than interacting directly with the OS 914. The libraries 916 may include system libraries 934 (for example, C standard library) that may provide functions such as memory allocation, string manipulation, file operations. In addition, the libraries 916 may include API libraries 936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 916 may also include a wide variety of other libraries 938 to provide many functions for applications 920 and other software modules.

The frameworks 918 (also sometimes referred to as middleware) provide a higher-level common infrastructure that may be used by the applications 920 and/or other software modules. For example, the frameworks 918 may provide various graphic user interface (GUI) functions, high-level resource management, or high-level location services. The frameworks 918 may provide a broad spectrum of other APIs for applications 920 and/or other software modules.

The applications 920 include built-in applications 940 and/or third-party applications 942. Examples of built-in applications 940 may include, but are not limited to, a contacts application, a browser application, a location application, a media application, a messaging application, and/or a game application. Third-party applications 942 may include any applications developed by an entity other than the vendor of the particular platform. The applications 920 may use functions available via OS 914, libraries 916, frameworks 918, and presentation layer 944 to create user interfaces to interact with users.

Some software architectures use virtual machines, as illustrated by a virtual machine 948. The virtual machine 948 provides an execution environment where applications/modules can execute as if they were executing on a hardware machine (such as the machine 1000 of FIG. 10, for example). The virtual machine 948 may be hosted by a host OS (for example, OS 914) or hypervisor, and may have a virtual machine monitor 946 which manages operation of the virtual machine 948 and interoperation with the host operating system. A software architecture, which may be different from software architecture 902 outside of the virtual machine, executes within the virtual machine 948 such as an OS 914, libraries 952, frameworks 954, applications 956, and/or a presentation layer 958.

Figure 10:
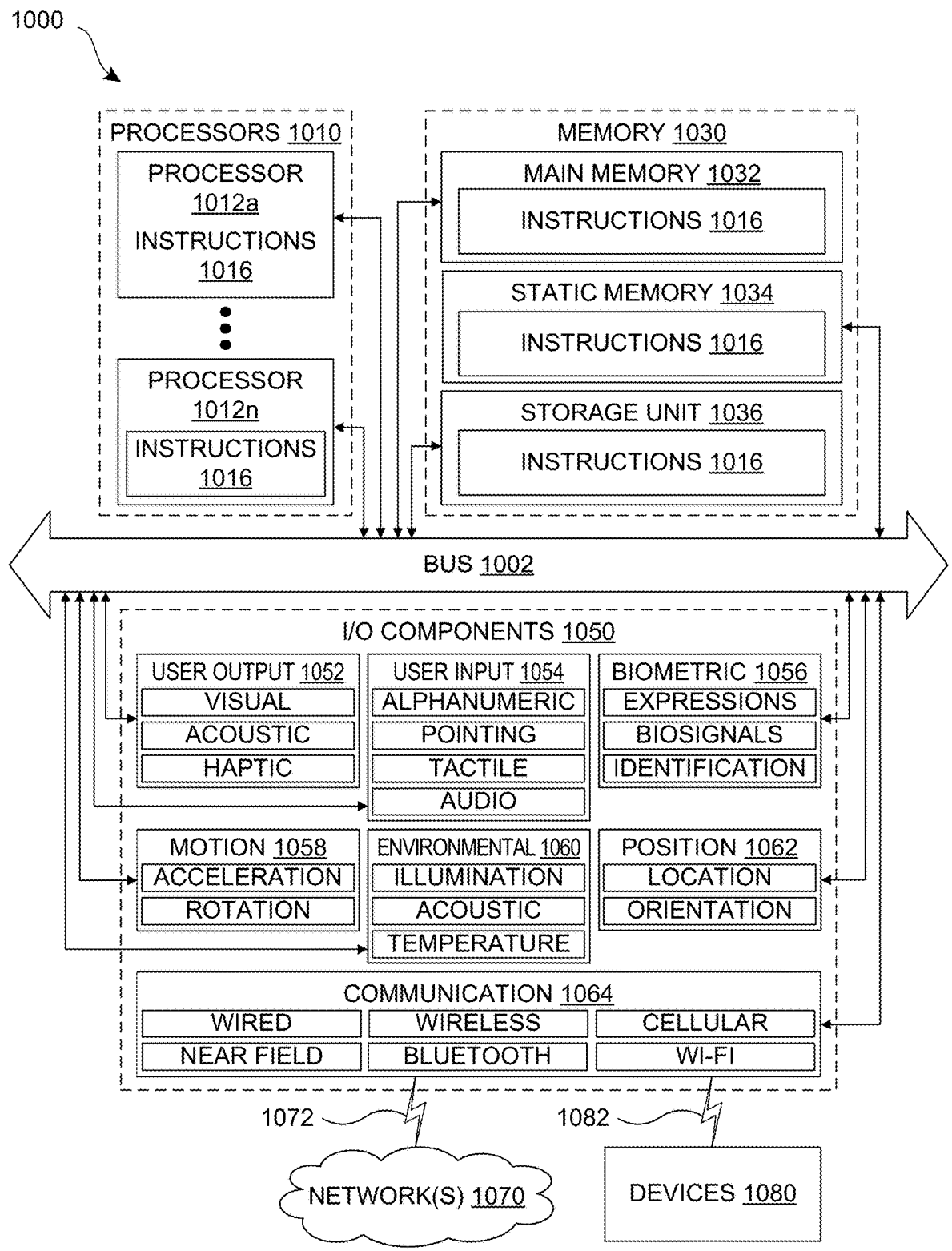
FIG. 10 is a block diagram illustrating components of an example machine configured to read instructions from a machine-readable medium and perform any of the features described herein.

FIG. 10 is a block diagram illustrating components of an example machine 1000 configured to read instructions from a machine-readable medium (for example, a machine-readable storage medium) and perform any of the features described herein. The example machine 1000 is in a form of a computer system, within which instructions 1016 (for example, in the form of software components) for causing the machine 1000 to perform any of the features described herein may be executed. As such, the instructions 1016 may be used to implement modules or components described herein. The instructions 1016 cause unprogrammed and/or unconfigured machine 1000 to operate as a particular machine configured to carry out the described features. The machine 1000 may be configured to operate as a standalone device or may be coupled (for example, networked) to other machines. In a networked deployment, the machine 1000 may operate in the capacity of a server machine or a client machine in a server-client network environment, or as a node in a peer-to-peer or distributed network environment. Machine 1000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1000 is illustrated, the term "machine" includes a collection of machines that individually or jointly execute the instructions 1016.

The machine 1000 may include processors 1010, memory 1030, and I/O components 1050, which may be communicatively coupled via, for example, a bus 1002. The bus 1002 may include multiple buses coupling various elements of machine 1000 via various bus technologies and protocols. In an example, the processors 1010 (including, for example, a central processing unit (CPU), a graphics processing unit (GPU), a digital signal processor (DSP), an ASIC, or a suitable combination thereof) may include one or more processors 1012a to 1012n that may execute the instructions 1016 and process data. In some examples, one or more processors 1010 may execute instructions provided or identified by one or more other processors 1010. The term "processor" includes a multi-core processor including cores that may execute instructions contemporaneously. Although FIG. 10 shows multiple processors, the machine 1000 may include a single processor with a single core, a single processor with multiple cores (for example, a multi-core processor), multiple processors each with a single core, multiple processors each with multiple cores, or any combination thereof. In some examples, the machine 1000 may include multiple processors distributed among multiple machines.

The memory/storage 1030 may include a main memory 1032, a static memory 1034, or other memory, and a storage unit 1036, both accessible to the processors 1010 such as via the bus 1002. The storage unit 1036 and memory 1032, 1034 store instructions 1016 embodying any one or more of the functions described herein. The memory/storage 1030 may also store temporary, intermediate, and/or long-term data for processors 1010. The instructions 1016 may also reside, completely or partially, within the memory 1032, 1034, within the storage unit 1036, within at least one of the processors 1010 (for example, within a command buffer or cache memory), within memory at least one of I/O components 1050, or any suitable combination thereof, during execution thereof. Accordingly, the memory 1032, 1034, the storage unit 1036, memory in processors 1010, and memory in I/O components 1050 are examples of machine-readable media.

As used herein, "machine-readable medium" refers to a device able to temporarily or permanently store instructions and data that cause machine 1000 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1016) for execution by a machine 1000 such that the instructions, when executed by one or more processors 1010 of the machine 1000, cause the machine 1000 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1050 may include a wide variety of hardware components adapted to receive input, provide output, produce output, transmit information, exchange information, capture measurements, and so on. The specific I/O components 1050 included in a particular machine will depend on the type and/or function of the machine. For example, mobile devices such as mobile phones may include a touch input device, whereas a headless server or IoT device may not include such a touch input device. The particular examples of I/O components illustrated in FIG. 10 are in no way limiting, and other types of components may be included in machine 1000. The grouping of I/O components 1050 are merely for simplifying this discussion, and the grouping is in no way limiting. In various examples, the I/O components 1050 may include user output components 1052 and user input components 1054. User output components 1052 may include, for example, display components for displaying information (for example, a liquid crystal display (LCD) or a projector), acoustic components (for example, speakers), haptic components (for example, a vibratory motor or force-feedback device), and/or other signal generators. User input components 1054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1050 may include biometric components 1056, motion components 1058, environmental components 1060, and/or position components 1062, among a wide array of other physical sensor components. The biometric components 1056 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1058 may include, for example, acceleration sensors (for example, an accelerometer) and rotation sensors (for example, a gyroscope). The environmental components 1060 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1062 may include, for example, location sensors (for example, a Global Position System (GPS) receiver), altitude sensors (for example, an air pressure sensor from which altitude may be derived), and/or orientation sensors (for example, magnetometers).

The I/O components 1050 may include communication components 1064, implementing a wide variety of technologies operable to couple the machine 1000 to network(s) 1070 and/or device(s) 1080 via respective communicative couplings 1072 and 1082. The communication components 1064 may include one or more network interface components or other suitable devices to interface with the network(s) 1070. The communication components 1064 may include, for example, components adapted to provide wired communication, wireless communication, cellular communication, Near Field Communication (NFC), Bluetooth communication, Wi-Fi, and/or communication via other modalities. The device(s) 1080 may include other machines or various peripheral devices (for example, coupled via USB).

In some examples, the communication components 1064 may detect identifiers or include components adapted to detect identifiers. For example, the communication components 1064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1062, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system operating a communications platform for handling communication sessions, comprising:
  a processor; and
  a computer-readable medium storing executable instructions for causing the processor to control the system to perform:
    storing, in a data storage, a plurality of profiles associated with a first user of the communications platform and including a first profile, each profile comprising:
      profile context information defining a condition for selecting the profile; and
      profile configuration information comprising a set of parameters used by the communications platform to establish a requested communication session, wherein the set of parameters defines a quality or type of the requested communication session;
    receiving, from a first device associated with the first user via a communication network, a request to initiate a communication session using contact information associated with a second user;
    in response to receiving the request, determining whether the contact information associated with the second user meets the condition defined in the profile context information of the first profile; and
    in response to determining that the contact information associated with the second user meets the condition defined in the profile context information of the first profile, establishing the communication session using the set of parameters of the profile configuration information of the first profile,
  wherein, for determining whether the contact information associated with the second user meets the condition defined in the profile context information of the first profile, the instructions further cause the processor to control the system to determine whether the contact information associated with the second user corresponds to an entry in a contact list associated with the first user.

2. The system of claim 1, wherein, for determining whether the contact information associated with the second user corresponds to the condition defined in the profile context information of the first profile, the instructions further cause the processor to control the system to perform determining whether the contact information associated with the second user corresponds to an entry in calendar information associated with the first user.

3. The system of claim 1, wherein:
  the contact information associated with the second user comprises a callee number of the second user, and
  for determining whether the contact information associated with the second user meets the condition defined in the profile context information of the first profile, the instructions further cause the processor to control the system to perform determining whether the callee number of the second user falls within a range of numbers associated with an entry in the contact list associated with the first user.

4. The system of claim 1, wherein:
  each set of parameters comprises a bandwidth or network traffic priority that defines a quality of the requested communication session, and
  for establishing the communication session, the instructions further cause the processor to control the system to perform allocating, to the communication session, the bandwidth or network traffic priority defined by the set of parameters of the profile configuration information of the first profile.

5. The system of claim 1, wherein the instructions further cause the processor to control the system to perform:
determining an originating network associated with the request received from the first device; and
determining that the first profile is permitted to be utilized with the originating network.

6. The system of claim 1, wherein:
the type of the requested communication session defined by each set of parameters includes one of communications via a cellular network, communications via a public switched telephone network, a text-based chat type communication session, voice calling type communication session and video calling type communication session, and
for establishing the communication session, the instructions, when executed by the processor, further cause the processor to control the system to perform implementing the type of the requested communication session defined by the set of parameters of the profile configuration information of the first profile.

7. A method of operating a system operating a communications platform, comprising:
storing, in a data storage, a plurality of profiles associated with a first user of the communications platform and including a first profile, each profile comprising:
profile context information defining a condition for selecting the profile; and
profile configuration information comprising a set of parameters used by the communications platform to establish a requested communication session, wherein the set of parameters defines a quality or type of the requested communication session;
receiving, from a first device associated with the first user via a communication network, a request to initiate a communication session using contact information associated with a second user;
in response to receiving the request, determining whether the contact information associated with the second user meets the condition defined in the profile context information of the first profile; and
in response to determining that the contact information associated with the second user meets the condition defined in the profile context information of the first profile, establishing the communication session using the set of parameters of the profile configuration information of the first profile,
wherein determining whether the contact information associated with the second user meets the condition defined in the profile context information of the first profile comprises determining whether the contact information associated with the second user corresponds to an entry in a contact list associated with the first user.

8. The method of claim 7, wherein determining whether the contact information associated with the second user corresponds to the condition defined in the profile context information of the first profile further comprises determining whether the contact information associated with the second user corresponds to an entry in calendar information associated with the first user.

9. The method of claim 7, wherein:
the contact information associated with the second user comprises a callee number of the second user, and determining whether the contact information associated with the second user meets the condition defined in the profile context information of the first profile comprises determining whether the callee number of the second user falls within a range of numbers associated with an entry in the contact list associated with the first user.

10. The method of claim 7, wherein:
each set of parameters comprises a bandwidth or network traffic priority that defines a quality of the requested communication session, and
establishing the communication session comprises allocating, to the communication session, the bandwidth or network traffic priority defined by the set of parameters of the profile configuration information of the first profile.

11. The method of claim 7, further comprising:
determining an originating network associated with the request received from the first device; and
determining that the first profile is permitted to be utilized with the originating network.

12. The method of claim 7, wherein:
the type of the requested communication session defined by each set of parameters includes one of communications via a cellular network, communications via a public switched telephone network, a text-based chat type communication session, voice calling type communication session and video calling type communication session, and
establishing the communication session comprises implementing, to the communication session, the type of the requested communication session defined by the set of parameters of the profile configuration information of the first profile.

13. A non-transitory computer readable medium containing instructions which, when executed by a processor, cause the processor to control a system operating a communications platform to perform functions of:
storing, in a data storage, a plurality of profiles associated with a first user of the communications platform and including a first profile, each profile comprising:
profile context information defining a condition for selecting the profile; and
profile configuration information comprising a set of parameters used by the communications platform to establish a requested communication session, wherein the set of parameters defines a quality or type of the requested communication session;
receiving, from a first device associated with the first user via a communication network, a request to initiate a communication session using contact information associated with a second user;
in response to receiving the request, determining whether the contact information associated with the second user meets the condition defined in the profile context information of the first profile; and
in response to determining that the contact information associated with the second user meets the condition defined in the profile context information of the first profile, establishing the communication session using the set of parameters of the profile configuration information of the first profile,
wherein, for determining whether the contact information associated with the second user meets the condition defined in the profile context information of the first profile, the instructions further cause the processor to control the system to determine whether the contact information associated with the second user corresponds to an entry in a contact list associated with the first user.

14. The non-transitory computer readable medium of claim 13, wherein, determining whether the contact information associated with the second user corresponds to the condition defined in the profile context information of the first profile, the instructions, when executed by the processor, further cause the processor to control the system to perform determining whether the contact information associated with the second user corresponds to an entry in calendar information associated with the first user.

15. The non-transitory computer readable medium of claim 13, wherein:
   the contact information associated with the second user comprises a callee number of the second user, and
   for determining whether the contact information associated with the second user meets the condition defined in the profile context information of the first profile the instructions, when executed by the processor, further cause the processor to control the system to perform determining whether the callee number of the second user falls within a range of numbers associated with an entry in the contact list associated with the first user.

16. The non-transitory computer readable medium of claim 13, wherein:
   each set of parameters comprises a bandwidth or network traffic priority that defines a quality of the requested communication session, and
   for establishing the communication session, the instructions, when executed by the processor, further cause the processor to control the system to perform allocating, to the communication session, the bandwidth or network traffic priority defined by the set of parameters of the profile configuration information of the first profile.

17. The non-transitory computer readable medium of claim 13, wherein the instructions, when executed by the processor, further cause the processor to control the system to perform:
   determining an originating network associated with the request received from the first device; and
   determining that the first profile is permitted to be utilized with the originating network.

18. The non-transitory computer readable medium of claim 13, wherein:
   the type of the requested communication session defined by each set of parameters includes one of communications via a cellular network, communications via a public switched telephone network, a text-based chat type communication session, voice calling type communication session and video calling type communication session, and
   for establishing the communication session, the instructions, when executed by the processor, further cause the processor to control the system to perform implementing, to the communication session, the type of the requested communication session defined by the set of parameters of the profile configuration information of the first profile.

\* \* \* \* \*